United States Patent [19]
Woodhall et al.

[11] Patent Number: 6,117,485
[45] Date of Patent: *Sep. 12, 2000

[54] DEXTRIN-BASED PROTECTIVE COATING COMPOSITIONS AND METHODS OF USE THEREOF

[75] Inventors: Edward W. Woodhall, Los Altos; Ronald Swidler, Palo Alto, both of Calif.

[73] Assignee: Cal-West Equipment Company, Inc., Sunnyvale, Calif.

[*] Notice: This patent is subject to a terminal disclaimer.

[21] Appl. No.: 09/122,224

[22] Filed: Jul. 24, 1998

Related U.S. Application Data

[63] Continuation-in-part of application No. 08/382,359, Feb. 1, 1995, Pat. No. 5,876,791.

[51] Int. Cl.$^7$ .................. B05D 3/00; B05D 7/24
[52] U.S. Cl. .................. 427/156; 427/154; 427/300; 427/353; 427/272; 427/282; 427/259; 106/162.1; 106/162.2; 106/2; 524/379; 524/557
[58] Field of Search .................. 427/154, 156, 427/282, 384, 385.5, 272, 300, 353, 259; 106/2, 162.1, 162.2; 524/379, 557; 424/400, 493; 426/811

[56] References Cited

U.S. PATENT DOCUMENTS

| | | | |
|---|---|---|---|
| 1,551,495 | 8/1925 | Lionne | 427/155 |
| 2,031,673 | 2/1936 | Schneider et al. | . |
| 3,034,915 | 5/1962 | Kornbluth | 427/155 |
| 3,455,712 | 7/1969 | Webb | 106/157 |
| 3,476,575 | 11/1969 | Arnold | 106/2 |
| 3,819,394 | 6/1974 | Schnebel, Jr. et al. | 117/6 |
| 3,839,066 | 10/1974 | Brenner | 117/6 |
| 3,853,576 | 12/1974 | Netznik | 117/515 |
| 4,009,076 | 2/1977 | Green et al. | 195/63 |
| 4,125,476 | 11/1978 | Dean | 252/115 |
| 4,145,855 | 3/1979 | Sheldon | 427/155 |
| 4,185,970 | 1/1980 | Dean | 55/89 |
| 4,253,999 | 3/1981 | Okishi | 106/2 |
| 4,325,745 | 4/1982 | Milevski | 106/2 |
| 4,632,848 | 12/1986 | Gosset et al. | 106/2 |
| 4,868,045 | 9/1989 | Horiki et al. | 428/314.4 |
| 5,028,350 | 7/1991 | Marsek | 252/88 |
| 5,143,949 | 9/1992 | Grogan et al. | 523/334 |
| 5,201,946 | 4/1993 | Marsek | 106/208 |
| 5,236,598 | 8/1993 | Hunter et al. | 210/705 |
| 5,302,413 | 4/1994 | Woodhall et al. | 427/54 |
| 5,308,647 | 5/1994 | Lappi | 427/154 |
| 5,330,564 | 7/1994 | Geke et al. | 106/2 |
| 5,418,006 | 5/1995 | Roth et al. | 427/154 |
| 5,429,839 | 7/1995 | Graiver et al. | 427/155 |
| 5,603,992 | 2/1997 | Woodhall et al. | 427/534 |
| 5,702,772 | 12/1997 | Skelly et al. | 427/536 |
| 5,876,791 | 3/1999 | Woodhall et al. | 427/154 |

FOREIGN PATENT DOCUMENTS

| | | | |
|---|---|---|---|
| 2391784 | 1/1979 | France | . |
| 249930 | 9/1925 | United Kingdom | 427/155 |
| 344453 | 12/1929 | United Kingdom | 427/155 |
| 93/20710 | 10/1993 | WIPO | . |
| 96/31540 | 10/1996 | WIPO | . |

*Primary Examiner*—Diana Dudash
*Attorney, Agent, or Firm*—Skjerven, Morrill, MacPherson, Franklin & Friel LLP; Tom Hunter

[57] ABSTRACT

A vehicle masking material and method of use. The masking material in one embodiment includes a dextrin, a plasticizer, and water. The masking material may additionally include a surfactant. The masking material is applied to a surface which is to be protected from paint overspray or other coating processes, allowed to dry, and the surface is coated (e.g. with paint). After drying of the paint, or other coating, the masking material is removed by water washing.

62 Claims, No Drawings

DEXTRIN-BASED PROTECTIVE COATING COMPOSITIONS AND METHODS OF USE THEREOF

CROSS-REFERENCE TO RELATED APPLICATIONS

This is a continuation-in-part of U.S. Ser. No. 08/382,359, filed on Feb. 1, 1995, now U.S. Pat. No. 5,876,791, which is herein incorporated by reference in its entirety for all purposes.

FIELD OF THE INVENTION

The present invention relates to the field of protective coatings to be used during coating operations of various surfaces including surfaces of vehicles or buildings. More specifically, in one embodiment the invention provides an improved method and composition for masking selected portions of a surface, in particular a vehicle surface, from paint. In another embodiment, this invention provides methods and compositions for protecting the walls and floors of a paint spray booth from paint overspray.

BACKGROUND OF THE INVENTION

It is well known that painting operations often require masking of certain portions of the surface of the painted object to prevent overspray. For example, it is often necessary to mask trim and windows on a vehicle (e.g. a motor vehicle) from paint overspray. Also, building stucco must frequently be protected from paint or primer coats. On occasion, it is necessary to mask painted portions of a vehicle or building from paints of a different color and overspray of paints of the same color. In addition, it is often desired to protect the surfaces (e.g. floors or walls) of the area (e.g. paint spray booth) in which the overcoating (e.g. painting) operation is performed.

In practice, masking operations are often one of the most time consuming and, therefore, expensive parts of the painting process. In spite of attempts to develop suitable chemical masks for vehicle painting, vehicle painters continue to use primarily masking tape and paper to cover portions of a vehicle where paint is not desired. To mask the trim on a car, for example, will often require many hours of tedious labor. Furthermore, even when done carefully, defects in such paint masks allow paint to contact surfaces that are desired to be protected.

Chemical masking solutions have been proposed to the problem of protecting surfaces during coating processing operations. However, such techniques have often not found extensive use. Some of the proposed chemical masks have been unsuitable for application to portions of a vehicle or building because of damage which would potentially occur to the protected portions of the vehicle or building. Other compositions are not water-soluble which increases the difficulty and expense of removal. In addition, masks that require solvents for removal are problematic in view of the increasing regulation of disposal of solvents as environmental regulation becomes stricter with time. Other compositions are difficult to apply, difficult to remove, excessively costly, or the like.

From the above it is seen that an improved masking that is easily applied and removed, that provides good surface protection, that is economical, and whose use entails little or no environmental impact is needed.

SUMMARY OF THE INVENTION

An improved masking composition and method is provided by virtue of the present invention. The method includes the steps of applying a substantially continuous film of a masking material on a vehicle (e.g. motor vehicle), building, floor, wall (e.g. spray booth floor wall or other spray booth surface) or other surface to be protected during a "coating operation" such as painting. The vehicle, building, or other surface may then be coated with a "coating compound" such as paint or any other compound which is to be applied to the surface. Finally, the masking material may be removed from the surface by washing with water thereby removing any coating compound that may be present on the masking material. These steps may be performed, for example, during an assembly line production of a vehicle or other article of manufacture.

By "coating operation" or "overcoating" it is desired to include any compound which is applied to a surface. Coating compounds include materials such as paint or other finishing materials such as lacquer, varnish, waxes and the like which adhere to the surface to which they are applied thereby forming a relatively permanent finish. Coating compounds, however, may also include compounds designed for temporary application to surfaces as in surface preparative treatments such as acids, oils, and antioxidants from which it may be necessary or desired to shield other surfaces.

By "building" it is intended to mean herein a house, warehouse, apartment, garage, store, or the like. By "vehicle" it is intended to mean herein a car, boat, plane, train, railroad car, or the like. By "substantially continuous film" it is intended to mean herein a film lacking pinholes through which paint or other materials generated during a coating operation processing could reach an underlying surface.

The masking material is, in one embodiment, a composition comprising dextrin and plasticizer. The masking materials preferably contain a high concentration of solids. In a particularly preferred embodiment, the dextrin may comprise from about 5 percent to about 50 or 60 percent, more preferably from about 20 percent to about 50 percent and most preferably about 30 percent to about 50 percent, by weight, of the composition. A particularly preferred embodiment comprises about 30 to about 40 percent, by weight dextrin. With some preferred embodiments comprising 10%, 15%, or 30% dextrin, respectively. Particularly preferred dextrins include, but are not limited to, tapioca dextrins and/or maltodextrins.

The masking material may additionally include a surfactant. The surfactant may comprise up to about 0.1 weight percent fluorinated surfactant. The surfactant, when present, ranges up to about 5 percent, more preferably up to about 2 percent, and most preferably up to about 1 percent, by weight, of the masking composition. The surfactant may include a foam reduction or foam control agent.

The composition is preferably formulated as an aqueous composition and thus, the remainder of the composition is preferably made up of water. Thus, water may range up to about 60 percent, more preferably up to about 50 percent, by weight, of the composition.

It has been found that for general purposes, a superior masking material includes dextrin, a plasticizer, a surfactant and water. According to preferred embodiments, the composition includes about 10 to about 50 percent dextrin, about 5 to about 50 percent plasticizer and not over 2 percent total surfactant. The surfactant may comprise up to about 0.05 weight percent fluorinated surfactant.

Thus, one particularly preferred embodiment, particularly well suited to application to walls comprises about 10% tapioca dextrin, about 3% of a 70% sorbitol solution, about 6% sucrose, about 3% glycerin, about 0.5% sulfonated surfactant, about 0.03% Fluorad FC171, about 0.02% Fluorad FC430, about 0.25% xanthan gum, and about 50 ppm kathon 1x preservative.

Another embodiment well suited to application to walls comprises about 15% tapioca dextrin, about 6% of a 70% sorbitol solution, about 2% sulfonated surfactant, about 0.5% keltone thickener, and about 50 ppm kathon lx preservative.

An embodiment well suited for application to floors comprises about 30% maltodextrin, about 6% of a 70% solution of sorbitol, about 6% glycerin, about 1% of a sulfonated surfactant, about 0.005% triethanolamine, and about 50 ppm kathon lx preservative.

Another preferred embodiment includes about 33 percent dextrin, about 7 percent plasticizer, and about 1.01 percent surfactant comprising about 0.01 percent fluorinated surfactant. The plasticizer may be urea or urea in combination with glycerine or a glycerine derivative such as glycerine monostearate or glycerine monooleate.

Another preferred composition comprises about 30 to 40 weight percent dextrin; about 5 to 10 weight percent plasticizer and not over 2 weight percent total surfactant. The surfactant may comprise up to about 0.1 weight percent fluorinated surfactant. Particularly preferred is a composition comprising about 33 weight percent dextrin; about 7 weight percent plasticizer; and about 1.01 weight percent surfactant comprising about 0.01 weight percent fluorinated surfactants. The surfactant may additionally contain a bulk surfactant such as DF-16 or Turkey Red (Acrysol 75). The plasticizer may be urea, or a combination of urea and a plasticizer selected from the group consisting of glycerine, glycerine monostearate and glycerine monooleate. Preferably about 15 to 20 weight percent of the urea may be substituted with glycerine or a glycerine derivative.

In another preferred embodiment, the masking composition includes about 40 percent dextrin, about 8 percent urea, and about 0.2 percent surfactant (e.g. Triton CF-10). The remaining 51.8 percent may be water. The urea in this embodiment may be replaced with about 2 percent, by weight glycerine. Alternatively, the urea may be replaced with a combination of 6 percent of urea and 2 percent glycerine.

In yet another preferred embodiment, the masking composition includes about 40 percent dextrin, about 20 percent urea, and about 0.2 percent surfactant (e.g. Triton X-100). Again, water may make up the remaining 39.8 percent.

Particularly preferred dextrins have a viscosity ranging from about 12 to about 20 seconds, more preferably from about 12 to about 15 seconds, and most preferably about 12 seconds in an aqueous solution comprising 40 percent solids (dextrins), as measured using a number 3 Zahn cup. Particularly preferred surfactants include fluorinated surfactants in combination with "bulk" surfactants such as Turkey Red (Acrysol 75), polyethoxy adducts or modified (poly) ethoxylates such as Triton DF-12, and DF-16.

The masking compositions may additionally be formulated with a combination of dextrin and aliphatic polyols such as polyvinyl alcohol. One preferred embodiment includes about 20 percent dextrin, about 10 percent polyvinyl alcohol (e.g., Elvanol 5105), about 2 percent of a 10% (wt/vol) solution of Triton CF-10, and about 65 percent, by weight, water.

Unless stated otherwise, and of course except when referring to water, all weight percentages herein, refer to the dry weight of the active material. Also, unless otherwise stated, weight percentages are given as weight percentages of the total aqueous composition before drying. Commercial products may contain water in addition to the active material. The coatings of this invention are compounded as aqueous solutions. As indicated above, water may therefore comprise up to about 60 percent by weight of the composition before drying.

In addition to the coating compositions themselves, this invention also provides methods of use for the coatings. Thus, in one embodiment, this invention provides methods of temporarily protecting a surface. The methods involve applying any of the masking materials described herein a surface to be protected such that the application results in a substantially continuous film of masking material. All or a portion of the surface is coated with a coating compound (e.g. paint), however the masking material prevents said coating compound from contacting the surface. Then, when desired, the masking material is removed from the surface.

In another embodiment this invention provides methods of method of neutralizing an isocyanate in an overcoating to facilitate disposal of the overcoating material. The method involves contacting the overcoating material with one or more of the dextrin-based protective coating composition described herein. The contacting can be when the coating composition is on a surface (e.g. a surface of a motor vehicle, a floor, a wall, etc.) and can optionally include removing the coating material and the overcoating from the surface by washing with water.

A further understanding of the nature and advantages of the invention described herein may be realized by reference to the remaining portions of the specification.

DETAILED DESCRIPTION

I. Protective Coating Compositions and their Use

The present invention provides an improved method and composition for protecting a vehicle (e.g. motor vehicle) or other surface subject to a coating operation such as painting. For example, certain regions of an automobile, or other surface, may be masked using the coating composition of the present invention to protect those regions from paint overspray in a painting booth.

In addition it is also often desired to protect the surfaces of the area in which an overcoating operation (e.g. painting) is performed. In particular, it is desired to protect the walls, floors and other surfaces of such an area (e.g. a painting booth) from paint overspray and spills. In addition, it is also desirable to reduce airborne dust in such areas during overcoating operations.

This invention provides compositions and methods to meet these needs. The methods entail coating the surface to be protected (e.g. surface of a car or truck or the walls and/or floors of a spray booth) with a temporary protective coating composition. One or more coating (e.g. painting) operations are performed and, when desired, the protective composition is removed.

The coating compositions of this invention, when applied to a surface (e.g. the surface of an automobile), produce a substantially continuous film that adheres well to the underlying surface. By "substantially continuous film" it is intended to mean herein a film generally lacking pinholes through which water, oil, paint, dust, or other materials could reach the underlying surface. Further, the material can be removed easily from the surface to be protected after use with a water wash, or by mechanical means such as scraping or peeling, or by combinations of these methods. In addition, because the material is fully biodegradable, it may be simply disposed of (e.g., washed down a sewer) with no substantial environmental impact.

Moreover, it was a discovery that the dextrin and water based compositions of this invention neutralize the isocyanates typically found in many overcoating compositions (e.g. automobile paint). Because the isocyanates are neutralized by contact with the coating composition, they may also be washed away with the protective coating with no substantial environmental impact.

A preferred method of protecting surfaces according to this invention includes steps of applying the coating compositions to the surface to be protected in a substantially continuous film. The compositions are then dried to form a coating that protects the underlying surface from the coating operation (e.g. paint overspray). The coating may be subsequently removed from the surface by simply washing with water when it is longer required. In a particularly preferred embodiment, the coatings of the present invention are used to protect components of motor vehicles (e.g. automobiles or automobile surface finishes), and the walls and floors of spray booths or other areas or structures that may be contacted with overspray in a coating (e.g., painting) operation.

In one embodiment, the coatings of this invention include a dextrin, a plasticizer and water. Dextrin comprises from about 5 percent to about 50 or 60 percent, more preferably from about 20 percent to about 50 percent and most preferably from about 40 percent to about 50 percent, by weight, of the composition. One particularly preferred embodiment comprises about 30 to 40 percent, by weight, dextrin.

II. Dextrins as Film Formers

Dextrins are widely known as products of the hydrolysis of starch, often by amylases. More specifically, dextrins are polymers of D-glucose, characterized by an $\alpha(1-4)$ linkage, which are intermediate in complexity between starch and maltose. The viscosity of dextrins, in aqueous solution, varies depending on dextrin length and degree of branching. However, compared with the original starch, dextrins produce aqueous solutions of lower viscosity. Commercially available dextrin typically comprises a mixture of higher viscosity and lower viscosity dextrins. As used herein, the term "dextrin" refers to that combination of higher and lower viscosity dextrins as would be obtained in a typical commercial preparation such as Amaizo 1895 (Cerestar C*+08602), 1890 (Cerestar C*+08601), and 1885 (produced by American Maize Products Co., now owned by Cerestar), Amiogum 35 (EmCap06377), and the like. Preferred dextrins have a viscosity ranging from about 12 to about 20 seconds, more preferably from about 12 to about 15 seconds, and most preferably about 12 seconds in an aqueous solution comprising 40 percent solids (dextrins), as measured using a number 3 Zahn cup. When measured as an aqueous solution comprising about 50 percent solids (dextrin) a most preferred dextrin has a viscosity ranging from about 95 to about 100 centipoise. One such preferred dextrin is an off-specification Amaizo 1895 designated Amaizo 2686N dextrin, available from American Maize Products, Co.).

While the "Amaizo" dextrins are derived from maize, dextrins derived from other sources are also suitable. These include native dextrins of any origin, synthetic, natural or hybrid, derived, for example from potatoes, manioc, corn, waxy corn, corn with high amylose content, wheat, rice, and the like. Other preferred embodiments utilize tapioca dextrins (also known as crystal gum, see e.g. K4484 from National Starch and Chemical Col, Birdgewater N.J.) and/or maltodextrins (e.g., Star-Dri 180, A.E. Stanley Co.). Preferred maltodextrins are products produced from corn starches. They are classified by "dextrose equivalent" or DE, which is a measure of the reducing sugars present calculated as dextrose and expressed as a percentage of the total dry substance. Preferred maltodextrins have DE values of less than about 20, more preferably less than about 15 and most preferably have a DE value of about 10. By comparison, dextrose of glucose has a DE of 100.

Dextrin is utilized in the films of the present invention to provide solids and to build film thickness. It was an unexpected discovery of the present invention, that the use of dextrins provides masking compositions that show exceptional coating, film forming, and drying properties. In particular, the use of high concentrations of dextrins allow the buildup of a thick coating which nevertheless shows relatively low viscosity, good coating properties and an extremely rapid drying time. This is in dramatic contrast to starch-based compositions that typically cannot achieve comparable high solids concentration. Starches form highly viscous aqueous solutions that tend to gel at a solids concentration far too low to permit formation of a continuous protective film. Prior to the present invention, it was unknown and unsuspected that the use of dextrins would overcome this limitation and form the basis of an effective paint masking composition.

The quantity and type of dextrin in the coating composition may be optimized for a particular application. This is accomplished empirically. Generally where it is desired that the composition dry to provide a thicker final coating more solids (dextrin) are added to the composition. However, the upper limits to dextrin concentration are dictated by the resulting viscosity of the composition. The viscosity of the wet coating must be low enough to permit application to and continuous coating of the surface. Thus, in order to produce a thick coating one increases the solids concentration, but not beyond a point where the composition becomes difficult or impossible to apply. Conversely, where a thin coating is desired, the solids composition may be decreased, but not to a point where the composition fails to form a continuous protective coating when dried.

It was a discovery of this invention, that where a thicker coating is desired, maltodextrins are particularly effective. Moreover, the maltodextrins dry to form a somewhat tacky coating and help to capture and retain airborne dust particles thereby helping to provide a reduced dust or dust-free environment for the overcoating operation. Because they produce a thick and relatively tough film, maltodextrins are particularly well suited in coating compositions designed for use on floors (e.g. floors of paint booths). Maltodextrins typically tend to yellow when subjected to drying cycles (heat). However, discoloration is rarely an issue for protective floor coverings.

In contrast, tapioca dextrins tend to form thinner coatings that dry quickly. The tapioca dextrins do not discolor on repetitive heating and hence are particularly well suited to applications on surfaces such as walls (e.g. the walls of a spray booth).

To some extent, the optimal solids content of the mixture is a function of the application method. It is expected that the composition may be applied by a variety of methods known to those of skill in the art. These methods include, but are not limited to painting, dipping, spraying, reverse roller coating, and the use of doctor bars. One of skill in the art will appreciate that application by spraying will generally require a composition of lower viscosity than application by the use of doctor bars. Thus a composition intended for application by spraying may contain a lower solids concentration than a composition applied by dipping or doctoring.

III. Plasticizers

The coatings of the present invention also include a plasticizer to provide toughness and flexibility and in particular to prevent cracking of the film during drying and subsequent handling. Suitable plasticizers are well known to those of skill in the art and include, but are not limited to glycerine, sorbitol, sugars (e.g. glucose, sucrose, levulose, dextrose, etc.), urea, triethylene glycol, polyethylene glycol, and other water soluble plasticizers. These plasticizers may be used alone, or in combination with each other. A particularly preferred combination of plasticizers is urea in combination with glycerine or glycerine derivatives such as glycerine monostearate or glycerine monooleate. Another particularly preferred combination is glycerin in combination with sorbitol.

Sorbitol, urea and glycerine are most preferred as plasticizers. When expressed as a percentage of the total coating compositions, the coatings utilizing urea as a plasticizer preferably include about 4 percent to about 12 percent urea, more preferably about 6 percent to about 12 percent urea and most preferably about 7 percent to about 12 percent urea, while the coatings utilizing glycerine and/or sorbitol as plasticizer preferably include about 0.8 percent to about 30 percent glycerine and/or sorbitol, more preferably about 4 to about 16 percent glycerine and/or sorbitol, and most preferably about 5 to about 10% glycerine and/or sorbitol.

In order to prevent cracking, the coatings of the present invention that are force dried typically require a higher plasticizer concentration than the coatings that are simply air dried. Thus, coatings that are simply air-dried may contain plasticizer in concentrations near the lower end of the ranges provided above. Thus, the air-dried coatings contain about 4 percent (10 percent, by weight, of the dextrin) urea or 0.8 percent (2 percent, by weight, of the dextrin) glycerine. Conversely, force dried coatings preferably contain higher concentrations of plasticizer. Thus, the force-dried coatings may contain about 7.2 percent (18 percent, by weight, of the dextrin) urea or about 2 percent (5 percent, by weight, of the dextrin) glycerine. Of course, coatings containing the higher amounts of plasticizer may be air dried as well. In addition, coatings containing the lower amount of plasticizer may often be successfully force-dried.

IV. Surfactants

The coatings of the present invention may additionally contain a surfactant. In preferred embodiments, the masking composition includes nonionic alkyl aryl surfactants such as Triton CF-10 and CF-12 (Rohm & Haas, Philadelphia, Pa., U.S.A.). Also suitable is Triton X-100 and surfactants having fluorinated alkyl chains such as "Fluorad" products sold by Minnesota Mining and Manufacturing (St. Paul, Minn., U.S.A.) and "Zonyl" products sold by DuPont Company (Wilmington, Del., U.S.A.) are also suitable. In addition, many embodiments include polyethoxy adducts or modified (poly)ethoxylates such as Triton DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104Amadc by Air Products), and the like. Preferred compositions include up to 5 percent surfactant. More preferred compositions include less than 2 percent surfactant, and most preferred compositions include about 1 percent, or less, by weight, surfactant.

To provide a continuous and level film, the masking composition should adequately wet the surface to be protected. However, many surfaces, in particular, car body finishes, are themselves highly hydrophobic or purposely treated (e.g. waxed) to have a low surface free energy so that water will bead. To facilitate wetting and thereby prevent the masking composition from beading, the surface tension of the masking composition may be lowered by the addition of a surfactant.

A primary role of the surfactant in the masking composition is to wet the substrate thereby leading to the formation of a continuous film. A sufficiently continuous protective film could be obtained with little or no surfactant so long as the masking composition contains a very high solids content (e.g., high concentrations of dextrin). Films containing high solids concentrations are often highly viscous and therefore difficult to apply, especially by spraying. While, as explained above, the use of dextrins allows the production of coatings with a high solids content, the use of surfactants or other wetting agents is preferred as coatings containing surfactants show superior film-forming properties in a variety of application methods.

Coating compositions having good wetting properties may be prepared by adding certain surfactant compositions, by adding alcohols such as propanol, methanol, or isopropyl alcohol, or by adding aliphatic polyols such as water soluble alcohols up to octanol. However, many alcohols are not readily biodegradable and hence surfactants are preferably used with the masking compositions of the present invention.

Preferred surfactants for use in the masking compositions of the present invention should have certain beneficial properties. For example, they should reduce the surface tension of the composition to a sufficiently low value that a level film, free of pinholes, is laid down. In most instances the surfactant will reduce the surface tension of the masking composition to at most about 25 dynes per centimeter, and more preferably to at most about 20 dyne/cm. To avoid formation of pinholes, the surfactant should not foam. Further, the surfactant should work with a variety of surfaces such as those containing silicones, acrylic waxes, teflon® waxes, clear coats, natural and hydrocarbon waxes, etc. Still further preferred surfactants will be relatively inexpensive, will provide a product that does not spot, streak, or frame (i.e., evaporate faster at edges such as molding and/or trim) on the surface to be protected. Finally, the surfactant should be water soluble and otherwise compatible with the other components of the masking composition so that the composition does not separate and leave pinholes when dry.

Because many surfaces to be protected will have unusually low surface free energies, the surfactant should be able to dramatically lower the surface and interfacial tensions of the masking composition. Compositions having very low surface tensions also tend to produce many fewer pinholes in the coating. Thus, any of the known classes of very low surface tension surfactants are preferred for use with this invention. One such class is the alkoxylates of fluorinated alkyl chains. Other functional derivatives (e.g., esters, sulfonates, carboxylates, ammonium compounds, etc.) of fluorinated alkyl chains also tend to produce low surface tension aqueous solutions. In general, replacement of hydrogens on an alkyl group by fluorine atoms leads to surfactants of unusually low surface tension. The above mentioned "Fluorads" and "Zonyls" are examples of surfactants having fluorinated alkyl chains.

It has been discovered that a particularly preferred embodiment includes 2 percent of a 10 percent aqueous solution of CF-10 or Triton X-100 giving a final concentration of 0.2% surfactant. Another preferred embodiment utilizes a sulfonated surfactant (e.g., D-40 or N-300 from BioSoft, Stepan Company) alone or in conjunction with one or more fluorinated surfactants (e.g., Fluorad FC 171 or FC 430, 3M Corporation). However, any combination of compatible surfactants that produce sufficient leveling on a given surface can be used. Particularly preferred compositions will provide a level film on a variety of different surfaces and will not spot, streak or frame when the film is rewetted.

The total surfactant in the material may include two or more different surfactants. In some embodiments, a "bulk" surfactant from a different chemical class will be admixed with a fluorinated surfactant to promote low interfacial tension and good rewetting properties. Preferred bulk surfactants will allow the mask to be rinsed off easily without spotting or streaking the underlying protected surface. Preferred bulk surfactants will produce very little or no foam during application or rinsing. They should also be relatively inexpensive. Suitable bulk surfactants include various compounds such as polyethoxylates and, in one case, octylphenoxypolyethoxyethanol. A particularly preferred bulk surfactant for use with Fluorad FC 171 and Fluorad FC 430 is Triton DF-16, a nonionic polyethoxylate or Turkey Red (Acrysol 75).

One particularly preferred formulation includes not over 2% total surfactant, but up to about 0.02%, more preferably about 0.01% to about 0.02% and most preferably about 0.01% to 0.02% of one or more fluorinated surfactants. One such surfactant comprises about 0.06% Fluorad FC 171, about 0.04% Fluorad FC 430 and about 1.0% Triton DF-16 or Turkey Red (Acrysol 75). Another preferred formulation comprises about 0.5% sulfonated surfactant (BioSoft N-300) about 0.03% Fluorad FC 171 and about 0.02% Fluorad FC 430.

V. Thickeners

Where substantial film build is desired the coating compositions of this invention can additionally include one or more thickeners. The thickener may be utilized to regulate the viscosity and film thickness of the protective coating composition. Thickeners, of course, renders the composition thicker so that it can be more easily applied to a vertical work surface. Thickeners also prevent the undesirable phenomenon of "sagging" in which the coating becomes thinner near the top of a vertical work surface.

Virtually any thickener can be used in the coatings of this invention. Preferred thickeners are compatible with water-based solutions and include, but are not limited to, gums (e.g. xanthan gum) kelgin, carboxymethylcellulose, hydroxymethyl cellulose, methylcellulose, etc. Acrylic thickeners selected for low water sensitivity (e.g., Carbopol® EP1) are also suitable, as are associative thickeners. Alkali-swellable acrylic emulsion thickeners capable of imparting shear-thinning characteristics (e.g., Carbopol® EP1) may also be used this invention. The thickener may be present at about 0.1 to 3 percent, more preferably at about 0.2 percent to about 1 percent, and most preferably at about 0.25 percent, by weight, of the composition.

VI. pH Adjustment

Preferred embodiments may also include components to adjust pH. Means of adjusting pH are well known to those of skill in the art. In particular, where the composition is to be used as a masking composition on an automotive finish, it is often desirable to adjust the composition to a basic pH of about 8 to about 9. This may be accomplished by the addition of one of a number of water soluble bases well known to those of skill in the art. These include, but are not limited to sodium hydroxide, sodium bicarbonate and amine bases such as pyridine and ethylamine and ammonia. In one particularly preferred embodiment, the pH of the coating composition is adjusted to a slightly basic pH (e.g. pH~8.0). This tends to prevent agglomeration of the dextrins, particularly during storage.

VII. Preservatives

The constituents of the coating compositions of this invention are largely organic compounds that will readily support the growth of microorganisms such as microbes, fungi, and the like. Thus, in one embodiment, to increase storage life, it is desired to include a preservative. The term "preservative", as used herein, is intended to designate a substance showing antimicrobial properties, in particular bactericidal properties and preferably also antifungal properties. Preservatives are well known to those of skill in the art and include, but are not limited to, anti-bacterial agents, anti-fungal agents, bacteriostatic agents, fungistatic agents, and enzyme inhibitors. Suitable preservatives include, but are not limited to benzoic acid, sorbic acid or the salts thereof, thimerosal (or merthiolate), phenyl mercuric acetate, phenyl mercuric nitrate, detergents (e.g. benzalkonium chloride), and sodium azide. Preferred preservatives are relatively or completely non-toxic to higher animals (e.g. mammals) and, thus, preservatives commonly used in foodstuffs and medical products are suitable. Such preservatives include, but are not limited to ethyl alcohol, chlorhexidine gluconate, sorbic and benzoic acid and their salts, and the like. Other preferred preservatives include Kathon LX (Rohm Haas, Inc.) and BTC 2125 (Stepan Chemical Co., Inc.).

VIII. Other Preferred Formulations

In another preferred embodiment, the masking compositions of the present invention may include an aliphatic polyol such as polyvinyl alcohol in addition to the dextrin. When present a polyvinyl alcohol comprises from about 2 percent to about 15 percent, more preferably from about 5 percent to about 12 percent and most preferably about 10 percent, by weight, of the masking composition. One particularly preferred aliphatic polyol is DuPont Corporation's Elvanol 5105 having a molecular weight of about 15,000 to about 27,000 daltons. The aliphatic polyol component may include two different polyols having different molecular weight ranges. For example, DuPont Corporation's Elvanol 5105 (15,000 to 27,000 daltons) and Elvanol 5042 (70,000 to 100,000 daltons) can be used together in some formulations.

It has been found that for general purposes, a superior masking material includes dextrin, a plasticizer, a surfactant and water. According to preferred embodiments, the composition includes about 10 to about 50 percent dextrin, about 5 to about 50 percent plasticizer and not over 2 percent total surfactant. The surfactant may comprise up to about 0.05 weight percent fluorinated surfactant.

Thus, one particularly preferred embodiment, particularly well suited to application to walls comprises about 10% tapioca dextrin, about 3% of a 70% sorbitol solution, abotu 6% sucrose, about 3% glycerin, about 0.5% sulfonated surfactant, about 0.03% Fluorad FC 171, about 0.02% Fluorad FC430, about 0.25% xanthan gum, and about 50 ppm kathon lx preservative.

Another embodiment well suited to application to walls comprises about 15% tapioca dextrin, about 6% of a 70% sorbitol solution, about 2% sulfonated surfactant, about 0.5% keltone thickener, and about 50 ppm kathon lx preservative.

An embodiment well suited for application to floors comprises about 30% maltodextrin, about 6% of a 70% solution of sorbitol, about 6% glycerin, about 1% of a sulfonated surfactant, about 0.005% triethanolamine, and about 50 ppm kathon lx preservative.

Another preferred embodiment includes about 33 percent dextrin, about 7 percent plasticizer, and about 1.01 percent surfactant comprising about 0.01 percent fluorinated surfactant. The plasticizer may be urea or urea in combination with glycerine or a glycerine derivative such as glycerine monostearate or glycerine monooleate.

In still another preferred embodiment the coating composition may include about 40% dextrin and about 0.2 percent surfactant (e.g. Triton CF-10 or Triton X-100 by Rohm and Haas), plasticizer, and the remainder water. Thus one particularly preferred embodiment includes about 40 percent dextrin, 8 percent urea, 2 percent of a 10 percent (w/v) aqueous solution of surfactant (e.g. Triton CF-10), and 50% water. In another preferred embodiment, the 8 percent urea or the preceding embodiment is substituted with a combination of urea and glycerine comprising about 2 percent (of the total composition) glycerine and 5 percent (of the total composition) urea. In yet another embodiment, the 8 percent of urea may be replaced with about 2 percent glycerine and the water may be increased to about 56 percent of the total composition. Yet another embodiment, particularly suitable for force drying, includes about 40 percent dextrin, about 20 percent urea, about 2 percent of a 10 percent (w/v) solution of surfactant (e.g. Triton X-100), and about 38 percent water.

Finally, one preferred embodiment, including an aliphatic polyol includes about 20 percent dextrin, about 10 percent polyvinyl alcohol (e.g. Elvanol 5105), about 3 percent glycerine, about 2 percent of a 10 percent (w/v) of a surfactant (e.g. Triton CF-10) and about 65 percent, by weight, water.

The mask composition is an aqueous solution and therefore includes a substantial amount of water before drying. A variety of other materials may also be included in the coatings to confer specific additional properties. Thus, for example, the coating compositions may additionally include dyes or colorants, antioxidants or corrosion inhibitors, ultraviolet inhibitors, flash rust inhibitors and the like. Preferred embodiments may include foam reduction or foam control agents such as FoamMaker™, Bubble Breaker™, and 1 and 2 octanol. Antistatic compounds (preferably water soluble antistatics such as Larostat 264A made by Mazer Chemicals) may be added in preferred embodiments prevent dust from being drawn to the surface. Preferred embodiments may also include sequesterants (typically less than 1%).

IX. Coating Preparation

The coating solutions are made by conventional means which typically comprise mixing the components of the masking material at substantially atmospheric pressure, so as to form a homogeneous solution. Heat may be applied to speed preparation of the coating solution. After formation of a homogeneous solution, the pH may be adjusted as discussed above. In a particularly preferred embodiment, the pH is adjusted to pH 8–9 by the addition of ammonia or other pH adjusting reagents.

The coating compositions are conveniently formulated as aqueous (waterbased) solutions or emulsions. The aqueous formulation generally lacks toxic solvents and is therefore relatively easy to handle and work with and is readily disposed of without adverse environmental impact. Thus, it is generally desirable to avoid the inclusion of any reagents (e.g. oil, organic solvents, etc.) that impose difficulties in handling and/or disposal. Preferred coating compositions are therefore aqueous compositions substantially or completely oil free and free of organic solvents.

X. Coating Application

The coating (masking) material is applied by one of a variety of techniques known to those of skill in the art. These include painting, dipping, spraying, reverse roller coating, and the use of doctor bars. Particularly preferred techniques include brushing and spraying of the material. In one preferred embodiment the surface to be protected is blown dry of dust and debris. In some cases, additional water may be added for easier application, such as a 10% dilution. Thereafter, the masking material is applied with a pressure pot sprayer, preferably first in a thin mist and, thereafter, in a flow coat or thicker substantially continuous film. For some applications, the mist coat will not be necessary. The mask material is sprayed primarily on the surface to be protected, although overspray will not pose significant problems since any overspray may be readily removed with, for example, a wet towel or sponge.

In preferred embodiments, the resulting masking coating is applied in a wet coating in a thickness ranging from about 1 to about 10 mils, more preferably ranging from about 1 to about 4 mils, and most preferably ranging from about 1 to about 2 mils. This wet coating then dries to form a continuous dry coating ranging from about 0.5 to about 5, more preferably from about 0.5 to about 2 and most preferably from about 0.5 to about 1 mil in thickness.

The masking material is typically permitted to dry at atmospheric temperatures and pressures. For a 1 to 2 mil wet thickness coating, such drying will take about 10 minutes at 70° F. and about 50% humidity.

Alternatively, the masking composition may be force-dried. Force drying may be accomplished by means well known to those of skill in the art. These include, but are not limited to the application of heat (e.g. radiant heating, oven baking, or hot air blowers), the reduction of air humidity, air movement or any combination of these means. Under forced drying conditions at about 150° F. and about 50% humidity, the same coatings will dry in about 2 minutes.

After drying of the masking composition, the remaining unprotected surface is then painted or otherwise coated without fear of overspray on the portions of the surface protected by the masking material. If the processing operation includes painting, the paint applied to the surface and allowed to thoroughly dry. Such drying times will vary radically depending upon the particular type of paint utilized.

After drying of the paint, the masking material is removed from the protected surface. Such removal operations may include, for example, peeling or scraping of the material off of the protected surface. However, it is most preferred that the masking composition be removed by normal washing with water. Pressure washing with water may be desired in some instances. The material will be removed readily since it is easily miscible or soluble in water.

One of skill in the art will readily appreciate that the steps of applying and drying the masking composition, applying and drying the paint or other subsequent coating, and removing the masking coating may be easily set up for mass production, as in an assembly line.

EXAMPLES

The following examples are intended to illustrate the present invention and are not intended to limit the scope of the invention in any way.

EXAMPLE 1

To produce the various surface protective coatings, designated coating 1 through coating 4, dextrin, a plasticizer, a surfactant and water were combined in the amounts shown in Table 1. The components were combined at room temperature and at atmospheric pressure by slow stirring to form the various surface protective coating compositions shown in Table 1. The homogeneous coating compositions were then adjusted to pH 9 by the addition of ammonia.

TABLE 1

Composition of four dextrin-based masking compositions.

| | Weight Percent* | | | |
|---|---|---|---|---|
| Ingredient | Coating 1 | Coating 2 | Coating 3 | Coating 4 |
| Dextrin Amizo 1895 | 40 | 40 | 40 | 40 |
| Urea Adrich 208884 | 8 | — | 6 | 20 |
| Glycerine 96% USP grade, Dow Chemical | — | 2 | 2 | — |
| Triton CF-10 | 0.2 | 0.2 | 0.2 | — |
| Triton X-100 | — | — | — | 0.2 |
| Deionized Water | 51.8 | 57.8 | 51.8 | 39.8 |

*Weight percent refers to weight percent of the total composition accounted for by the active ingredient.

The coatings were each applied, by spraying, to an automotive body panel test surface thereby masking a portion of the test surface. The coatings were then either air dried or force-dried by heating.

The masked test panel was then sprayed with an automotive body paint and allowed to dry. The coating compositions were then removed from the masked portion of the panel by simply washing the panel with water.

The coatings generally provided uniform wetting of the test surface. They dried rapidly, typically a 1 mil layer drying in about 21 minutes at ambient temperature (approximately 60° F. and 50% humidity).

The coatings were easily removed by the application of pressurized water and the masked regions showed little or no penetration by the paint.

EXAMPLE 2

The components illustrated in Table 2 are combined, in the amounts shown, at room temperature and at atmospheric pressure by slow stirring to form a surface protective coating composition. Again, ammonia is added to adjust the pH to pH 9.

TABLE 2

Composition of a dextrin/polyvinyl alcohol based masking composition.

| Ingredient | Weight Percent* |
|---|---|
| Dextrin Amaizo 5985 | 20 |
| Elvanol 5105 | 10 |
| Glycerin | 3 |
| Triton CF-10 | 0.2 |
| Deionized Water | 66.8 |

*Weight percent refers to weight percent of the total composition accounted for by the active ingredient.

The composition is applied to a test panel and allowed to dry as described in Example 1. The test panel is then painted and allowed to dry. The masking composition is then washed off of the panel using water to reveal the masked surface.

EXAMPLE 3

Coatings were also prepared using a low viscosity dextrin having a viscosity ranging from about 95 to about 100 centipoise in an aqueous solution comprising about 50% solids. The coating were prepared containing the percentages of dextrin, plasticizer and surfactants as shown in Table 3. Once a homogeneous solution was obtained, the pH was adjusted to 9 by the addition of ammonia.

TABLE 3

Composition of various low viscosity dextrin compositions.

| | Weight Percent | | | |
|---|---|---|---|---|
| Ingredient | Coating 1 | Coating 2 | Coating 3 | Coating 4 |
| Low Viscosity Dextrin Amaizo 2686N | 33 | 33 | 33 | 33 |
| Urea Aldrich 208884 | 7 | 7 | 5.6–5.95 | 5.6–5.95 |
| Glycerine monosterate or glycerine monoleate | — | — | 1.05–1.4 | 1.05–1.4 |
| DF16 | 1 | — | — | — |
| Turkey Red Acrysol 75 | — | 1 | 1 | 1 |
| FC171 3M | 0.06 | 0.06 | 0.06 | 0.06 |
| FC430 3M | 0.04 | 0.04 | 0.04 | 0.04 |
| Deionized Water | 58.9 | 58.9 | 58.9 | 58.9 |

*Weight percent refers to weight percent of the total composition accounted for by the active ingredient.

The coatings were applied to test panels by spraying. The coatings generally provided uniform wetting of the test surface. They dried rapidly, typically a 10 mil layer drying in about 21 minutes at ambient temperature (approximately 60° F. and 50% humidity).

The coatings were easily removed by the application of pressurized water and the masked regions showed little or no penetration by the paint.

EXAMPLE 4

To compare a dextrin-based coating of the present invention with the commercially available polyvinyl alcohol coating SlimePlus™, each half of a test panel bearing an automotive acrylic finish, was respectively coated with SlimePlus™ or with a dextrin coating comprising the components illustrated in Table 3.

TABLE 4

Test composition for comparison with SlimePlus ™.

| Ingredient | Weight Percent* |
| --- | --- |
| Dextrin | 33% |
| Amaizo 1895 | |
| Urea | 7% |
| Aldrich 208884 | |
| DF-16 surfactant | 1% |
| Union Carbide | |
| FC-171 | 0.06% |
| 3M | |
| FC-430 | 0.04% |
| 3M | |
| Deionized Water | 58.9% |

*Weight percent refers to weight percent of the total composition (wet formulation) accounted for by the active ingredient.
**After the components listed above were combined to form a heterogeneous solution, the pH was adjusted to pH 9 by the addition of ammonia.

The two sides of the panel were simultaneously coated; one with the SlimePlus™ composition and the other with the dextrin composition. The wet coatings were applied in a thickness sufficient to provide a uniform continuous dry film about 1 mil thick. This required about a 10 mils wet coating of SlimePlus™, while only a 2–3 mil wet coating of the dextrin compound.

Under ambient conditions (about 62° F. and 60% humidity), the dextrin composition dried in about 21 minutes, while the SlimePlus™ coating took well over an hour to dry. Both coatings provided a continuous substantially free of pinholes and dry to the touch.

The dextrin based coating, however, eliminated a whitening of black paint observed with SlimePlus™. Without being bound to a particular theory, it is believed that SlimePlus™ passes through a gel phase when drying. This gel phase tends to hydrate the automotive paint coating on the underlying surface producing a temporary local whitening. The dextrin coatings of the present invention eliminate paint hydration and the resulting whitening thereby requiring less post rinse-off cleaning of the underlying (protected) surface.

EXAMPLE 5

Coatings were also formulated using either a tapioca dextrin (for coatings optimized for application to paint booth walls or a maltodextrin (for coatings optimized for application to floors) as shown in Table 5. The coatings were formulated as a homogeneous aqueous solution. When applied to paint booth walls, the "crystal booth" coatings offered good protection, did not discolor through repeated drying cycles, and were easily removed by washing. The "clean room" coating, when applied to the floor showed good build, provided a slightly tacky finish that helped suppress dust, and was readily removed by washing.

TABLE 5

Formulation of coating compositions optimized for application to paint booth walls (crystal booth 1 and crystal booth 2) or to paint booth floors (clean room).

| | | | Preferred Embodiments | | |
| --- | --- | --- | --- | --- | --- |
| | Components | Range | Crystal Booth 1 | Crystal Booth 2 | Clear-Room |
| Film Former | Dextrin: Crystal Gum (Tapioca Dextrin) (K4484, National Starch) Star-DRI 180 (maltose dextrin) Star-Dri 180 or Star-Dri100, 1, 5, 200 | 2%–50% | 10% | 15% | 30% |
| Plasticizer | Sorbitol (70% Solution) | 0–16% | 3% | 6% | 6% |
| | Sugar (sucrose) | 0–16 | 6% | | |
| | Glycerin | 0–16 | 3% | | 6% |
| Thickener | Xanthan Gum (Kelzan) | 0–1.0% | 0.25% | | |
| | Keltone or carboxymethyl cellulose, hydroxymethyl-cellulose, polyethylene oxide etc. | | | 0.5% | |
| Surfactant | Sulfonated Biosoft N-300 (Stepan Chemical Co.) or BioSoft D40, Sulfochem-TLS or Sulfochem-ALS Fluorinated | 0.1–2.0% 0.1–2.0% | 0.5% | 2% | 1% |
| | Fluorad FC 171 | 0–0.6% | 0.03% | | |
| | Fluorad FC 430 (3M Corp.) | 0–0.4% | 0.02% | | |
| pH adjustment 85% solution | triethanolamine or potassium carbonate or sodium carbonate | 0.01–1.0 | | | 0.5 |
| Preservative | Kathon Lx | 10 ppm–100 ppm | 50 ppm | 50 ppm | 50 ppm |

The above description is illustrative and not restrictive. Many variations of the invention will become apparent to those of skill in the art upon review of this disclosure. Merely by way of example, while the invention is illustrated with regard to particular brands of materials used in the mask, the invention is not so limited. The scope of the invention should, therefore, be determined not with reference to the above description, but instead should be determined with reference to the appended claims along with their full scope of equivalents.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of temporarily protecting a surface, said method comprising:
    a) applying a masking material to said surface, said applying resulting in a substantially continuous dry film of said masking material, and said masking material, before drying, comprising an aqueous solution of:
  i) a dextrin present in an amount ranging from about 2 to about 50 weight percent of said masking material; and
  ii) a plasticizer present in an amount sufficient to prevent cracking of said film when said masking material is dried;
b) coating all or a portion of said surface with a coating compound, said masking material preventing said coating compound from contacting said surface; and
c) removing said masking material from said surface; said removing step being performed after said coating step.

2. The method of claim 1, wherein said surfaces comprise a surface of a motor vehicle.

3. The method of claim 1, wherein said surfaces comprise a surface of a paint booth.

4. The method of claim 3, wherein said surfaces comprise a wall of a paint booth.

5. The method of claim 3, wherein said surfaces comprise a floor of a paint booth.

6. The method of claim 1, wherein said dextrin is selected from the group consisting of a tapioca dextrin and a maltodextrin.

7. The method of claim 1, wherein said plasticizer is selected from the group consisting of sorbitol, glycerin, sucrose, urea, polyethylene glycol, and polypropylene glycol.

8. The method of claim 1, wherein said masking material further comprises a surfactant.

9. The method of claim 1, wherein said masking material further comprises a thickener.

10. The method of claim 1, wherein said masking material further comprises a preservative.

11. The method of claim 1, wherein said plasticizer is present in an amount ranging from about 0.8 to about 12 weight percent of said masking material.

12. The method of claim 11, wherein:
said dextrin is a maltodextrin; and
said masking material further comprises a surfactant.

13. The method of claim 12, wherein said plasticizer comprises about 10% of a mixture of sorbitol and glycerin.

14. The method of claim 13, wherein said surfactant is a sulfonate present at an amount up to about 2%, by weight, of said masking composition.

15. The method of claim 14, wherein said masking material further comprises a preservative.

16. The method of claim 15, wherein said masking material comprises:
about 30% maltodextrin;
a plasticizer comprising about 4% sorbitol and about 6% glycerin;
about 1% sulfonated surfactant; and
a preservative.

17. The method of claim 11, wherein:
said dextrin is a tapioca dextrin; and
said masking material further comprises a surfactant.

18. The method of claim 17, wherein said plasticizer comprises about 3% to about 6% sorbitol.

19. The method of claim 18, wherein said surfactant is a sulfonate present at an amount up to about 2%.

20. The method of claim 19, wherein said masking material further comprises a thickener.

21. The method of claim 20, wherein said masking material comprises:
about 10% tapioca dextrin;
a plasticizer comprising sorbitol, sucrose, and glycerin;
a surfactant comprising a sulfonated surfactant and a fluorinated surfactant; and
up to about 1% a thickener; and
a preservative.

22. The method of claim 20, wherein said masking material comprises:
about 15% tapioca dextrin;
a plasticizer comprising about 6% sorbitol;
a sulfonated surfactant; and
up to about 1% a thickener; and
a preservative.

23. A composition for temporarily protecting comprising an aqueous solution of:
a dextrin present in an amount ranging from about 2 to about 50 weight percent of said composition; and
a plasticizer present in an amount sufficient to prevent cracking of a film formed when said composition is dried on a surface.

24. The composition of claim 23, wherein said dextrin is selected from the group consisting of a tapioca dextrin and a maltodextrin.

25. The composition of claim 23, wherein said plasticizer is selected from the group consisting of sorbitol, glycerin, sucrose, urea, polyethylene glycol, and polypropylene glycol.

26. The composition of claim 23, wherein said composition further comprises a surfactant.

27. The composition of claim 23, wherein said composition further comprises a thickener.

28. The composition of claim 23, wherein said composition further comprises a preservative.

29. The composition of claim 23, wherein said plasticizer is present in an amount ranging from about 0.8 to about 12 weight percent of said composition.

30. The composition of claim 29, wherein:
said dextrin is a maltodextrin; and
said masking material further comprises a surfactant.

31. The composition of claim 30, wherein said plasticizer comprises a mixture of sorbitol and glycerin at about 10%, by weight of said composition.

32. The composition of claim 31, wherein said surfactant is a sulfonate present at an amount up to about 2%, by weight, of said composition.

33. The composition of claim 32, wherein said composition further comprises a preservative.

34. The composition of claim 33, wherein said composition comprises:
about 30% maltodextrin;
a plasticizer comprising about 4% sorbitol and about 6% glycerin about 1% sulfonated surfactant; and
a preservative.

35. The composition of claim 29, wherein:
said dextrin is a tapioca dextrin; and
said masking material further comprises a surfactant.

36. The composition of claim 35, wherein said plasticizer comprises about 3% to about 6%, by weight of said composition, sorbitol.

37. The composition of claim 36, wherein said surfactant is a sulfonate present at an amount up to about 2% of said composition.

38. The composition of claim 37, wherein said masking material further comprises a thickener.

39. The composition of claim 38, wherein said composition comprises:
   about 10% tapioca dextrin;
   a plasticizer comprising sorbitol, sucrose, and glycerin;
   a surfactant comprising a sulfonated surfactant and a fluorinated surfactant; and
   up to about 1% a thickener; and
   a preservative.

40. The composition of claim 38, wherein said composition comprises:
   about 15% tapioca dextrin;
   a plasticizer comprising about 6% sorbitol;
   a sulfonated surfactant; and
   up to about 1% a thickener; and
   a preservative.

41. A method of neutralizing an isocyanate in an overcoating material for disposal, said method comprising:
   contacting said overcoating material with a protective coating composition an aqueous solution of:
      i) a dextrin present in an amount ranging from about 2 to about 50 weight percent of said composition; and
      ii) a plasticizer present in an amount sufficient to prevent cracking of a film formed when said coating composition is dried on a surface.

42. The method of claim 41, further comprising removing said coating composition from said surface by washing with water.

43. The method of claim 41, wherein said dextrin is selected from the group consisting of a tapioca dextrin and a maltodextrin.

44. The method of claim 41, wherein said plasticizer is selected from the group consisting of sorbitol, glycerin, sucrose, urea, polyethylene glycol, and polypropylene glycol.

45. The method of claim 41, wherein said masking material further comprises a surfactant.

46. The method of claim 41, wherein said masking material further comprises a thickener.

47. The method of claim 41, wherein said masking material further comprises a preservatives.

48. The method of claim 41, wherein said plasticizer is present in an amount ranging from about 0.8 to about 12 weight percent of said masking material.

49. The method of claim 48, wherein:
   said dextrin is a maltodextrin; and
   said masking material further comprises a surfactant.

50. The method of claim 49, wherein said plasticizer comprises about 10% of a mixture of sorbitol and glycerin.

51. The method of claim 50, wherein said surfactant is a sulfonate present at an amount up to about 2%, by weight, of said masking composition.

52. The method of claim 51, wherein said masking material further comprises a preservative.

53. The method of claim 52, wherein said masking material comprises:
   about 30% maltodextrin;
   a plasticizer comprising about 4% sorbitol and about 6% glycerin
   about 1% sulfonated surfactant; and
   a preservative.

54. The method of claim 48, wherein:
   said dextrin is a tapioca dextrin; and
   said masking material further comprises a surfactant.

55. The method of claim 54, wherein said plasticizer comprises about 3% to about 6% sorbitol.

56. The method of claim 55, wherein said surfactant is a sulfonate present at an amount up to about 2%.

57. The method of claim 56, wherein said masking material further comprises a thickener.

58. The method of claim 57, wherein said masking material comprises:
   about 10% tapioca dextrin;
   a plasticizer comprising sorbitol, sucrose, and glycerin;
   a surfactant comprising a sulfonated surfactant and a fluorinated surfactant; and
   up to about 1% a thickener; and
   a preservative.

59. The method of claim 57, wherein said masking material comprises:
   about 15% tapioca dextrin;
   a plasticizer comprising about 6% sorbitol;
   a sulfonated surfactant; and
   up to about 1% a thickener; and
   a preservative.

60. The method of claim 1, wherein said masking material comprises:
   about 5% to about 50% dextrin;
   a plasticizer comprising sorbitol;
   a surfactant; and
   a water soluble base.

61. The method of claim 60, wherein said masking material further comprises about 0.1 to 3 percent thickener.

62. The method of claim 61, wherein said masking material further comprises a preservative.

* * * * *